(12) United States Patent
Joncour

(10) Patent No.: US 6,922,797 B2
(45) Date of Patent: Jul. 26, 2005

(54) ERROR CONCEALMENT METHOD OF DETECTING CORRUPTED SIGNAL PARAMETERS

(75) Inventor: Yann Andre Roland Joncour, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 620 days.

(21) Appl. No.: 09/794,941

(22) Filed: Feb. 28, 2001

(65) Prior Publication Data

US 2001/0027544 A1 Oct. 4, 2001

(30) Foreign Application Priority Data

Feb. 29, 2000 (EP) .......................................... 00400550

(51) Int. Cl.[7] .............................................. G06F 11/00
(52) U.S. Cl. ...................... 714/704; 714/747; 704/219; 375/146; 375/147
(58) Field of Search ................................ 714/747, 800, 714/704, 758; 704/219; 370/389; 455/561; 375/147, 146

(56) References Cited

U.S. PATENT DOCUMENTS

| | | | | |
|---|---|---|---|---|
| 4,688,224 A | * | 8/1987 | Dal Degan et al. | 714/747 |
| 6,021,385 A | | 2/2000 | Jarvinen et al. | 704/219 |
| 6,445,686 B1 | * | 9/2002 | Hoffbeck et al. | 370/318 |
| 2001/0043577 A1 | * | 11/2001 | Barany et al. | 370/328 |
| 2002/0126664 A1 | * | 9/2002 | Kiiski et al. | 370/389 |

FOREIGN PATENT DOCUMENTS

WO       WO009609704 A2  *  3/1996

OTHER PUBLICATIONS

Norbert Gortz, "On the Combination of Redundant and Zero–Redundant Channel Error Detection in CELP Speech Coding", EUPSICO 1998, pp. 721–724.

* cited by examiner

Primary Examiner—Guy J. Lamarre
(74) Attorney, Agent, or Firm—Jack D. Slobod; Dicran Halajian

(57) ABSTRACT

The error concealment method improves the signal quality in transmission systems. The method is used for processing speech signals which have been encoded to speech parameters before transmission via a transmission channel. It allows detection at the receiving end of corrupted signal parameters due to adverse channel conditions. The method comprises estimations of the signal quality and a statistic study of the evolution of the signal parameters so as to derive an indication that the parameter is probably corrupted. A first signal quality estimation is performed. It may be e.g. an estimation of the error probability within the most important bits of the frame. A second signal quality estimation is performed. It may be e.g. an estimation of the error probability within all bits of the frame. Depending on the results of the estimations, the statistic study is performed in order to detect which signal parameters are probably corrupted.

18 Claims, 2 Drawing Sheets

ERROR CONCEALMENT METHOD OF DETECTING CORRUPTED SIGNAL PARAMETERS

FIELD OF THE INVENTION

The invention relates to error concealment in transmission systems for improving the signal quality at the receiving end.

The invention has numerous applications in transmission systems. It is particularly advantageous in transmission systems which are submitted to adverse channel conditions, such as radio systems. The invention applies, for example, to speech transmission systems. It is therefore compatible with many speech encoders/decoders, or codecs such as, for example, the GSM (Global System for Mobile telecommunications) full-rate speech codec, the GSM enhanced full-rate speech codec and the AMR (Adaptive Multi-Rate) speech codec for the GSM and UMTS (Universal Mobile Telecommunication System) systems.

BACKGROUND ART

The article by Norbert Görtz "On the Combination of Redundant and Zero-Redundant Channel Error Detection in CELP Speech Coding" published in EUPSICO-98, pages 721–724, September 1998, describes an error concealment method of correcting, at the receiving end, corrupted speech parameters within bad frames. According to this method, a signal quality estimation is performed on the most important bits of the frame for indicating whether the frame is to be considered as bad or not. Then the method exploits parameter statistics in order to detect which one(s) of the speech parameter(s) of a bad frame is corrupted.

SUMMARY OF THE INVENTION

It is an object of the present invention to provide an error concealment method which yields a better signal quality.

The invention takes the following aspects into consideration. In digital transmission systems, the input signal is usually divided into consecutive frames of binary elements or bits. A frame of bits represents a set of signal parameters. Each signal parameter corresponds to a predefined characteristic feature of the signal. Some bits of a frame are considered as more important than others. These bits are called the most important bits. It is clear that a transmission error on any one of the most important bits would cause a serious degradation of the signal quality. Therefore, most communication standards such as, for example, the GSM system comprise signal quality estimation means for estimating on a frame-by-frame basis, the probability that transmission errors occurred in the most important bits of the frames. In the GSM system, such a signal quality estimation is referred to as CRC (Cyclic Redundancy Check). The CRC delivers a bad frame indicator BFI which indicates if the frame is to be considered as bad or not. The BFI indicator contains no information so as to indicate which parameters of a bad frame are corrupted.

In the cited document, a method is provided wherein, an error concealment procedure is performed on the basis of a CRC type result in order to check the CRC result and to detect which parameter(s) of a bad frame is (are) probably corrupted. The method uses the CRC result to distinguish between the frames that are to be considered as good frames and the frames that are to be considered as bad frames. Then, an intra-parameter difference is defined as the difference between the value of the parameter under processing and the last uncorrupted value of the same parameter. If the intra-parameter difference is larger than a predetermined threshold, the parameter under processing is considered to be probably corrupted. When a frame is to be considered as bad, the intra-parameter difference is calculated for each parameter of the frame in order to determine which one(s) of the parameter(s) is probably corrupted. When a frame is to be considered as good, the parameters of the frame are simply saved to be used, for example, in further processing. Further processing includes decoding of the signal parameters for retrieving the transmitted signal.

According to the cited method, parameters within frames which are detected as good by the CRC procedure are also considered as good and will be further processed as uncorrupted parameters. The cited method only calculates the intra-parameter difference when the CRC result indicates a bad frame. It does not provide means for checking the CRC result when it indicates a good frame. Actually, it may occur that the CRC fails to detect bad frames. Consequently, frames that are detected as good frames by the CRC may actually be corrupted. According to the cited method, this would cause a misdetection of probably corrupted parameters within these frames. Such a misdetection would thus lead to a normal decoding of corrupted parameters which could result in a severe degradation of the signal quality.

In accordance with the invention, a method, a computer program product for carrying out the method, a receiver and a radio telephone comprising a receiver wherein the computer program product can be imbedded, are provided which obviate the cited drawbacks of the known method. In this respect, a method as mentioned in the opening paragraph is provided wherein the error detection step comprises the following sub-steps:

- a first estimation of a first signal quality for deriving a first error probability estimation,
- a second estimation of a second signal quality for deriving a second error probability estimation and
- based on the first and second error probability estimations, a comparison between a current signal parameter and at least a previous signal parameter so as to derive if the current parameter is probably corrupted.

The method according to the invention performs a first estimation of a first signal quality and a second estimation of a second signal quality. The second estimation allows checking the result of the first estimation, for example, when the first estimation tends to indicate a good frame. Then, depending on the result of the first and second estimations, a comparison is performed in order to further check both estimation results and to detect which parameters are corrupted.

The invention brings the advantage of removing or at least reducing the perception of loud clicks caused by channel errors in the received signal. It also contributes to improving the intelligibility of the speech signal listened to by an end user.

BRIEF DESCRIPTION OF THE DRAWINGS

The invention and additional features, which may be optionally used to implement the invention to advantage, are apparent from and will be elucidated with reference to the drawings described hereinafter.

DETAILED DESCRIPTION OF THE DRAWINGS

Figure 1:
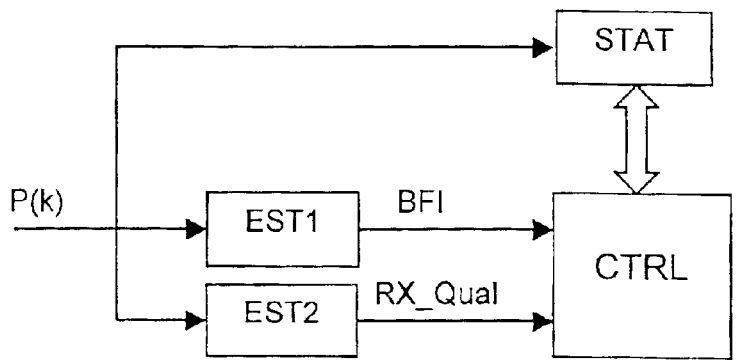
FIG. 1 is a schematic block diagram for illustrating a receiver according to the invention.

The block diagram shown in FIG. 1 is an example of a receiver according to the invention for receiving an encoded signal comprising subsequent signal parameters, denoted P(k), k being an integer representing the index of the parameter under processing. The receiver comprises error detection means for detecting probably corrupted signal parameters. The error detection means comprise:

a first quality estimator EST_1 for supplying a first error probability estimation BFI of a first signal quality, a second quality estimator EST_2 for supplying a second error probability estimation RX_Qual of a second signal quality, a statistic unit STAT for storing signal parameters that have been detected as uncorrupted and for comparing the current signal parameter P(k) with at least a previous uncorrupted signal parameter P(k−1), k−1 being an integer representing the index of the previous parameter, a control unit CTRL for activating the statistic unit STAT with respect to the first and second error probability estimations BFI and RX_Qual, for collecting the result of the comparison and for deriving from this result if the current parameter P(k) is probably corrupted.

According to a preferred embodiment of the invention, the first and second error probability estimations BFI and RX_Qual are based on different quality criteria. For example, if the signal parameters are contained in frames, at least the first quality estimator may estimate the probability of errors within the frame. If the frame comprises a set of most important bits, as is the case in most transmission systems such as the GSM system, the first quality estimator may estimate a probability of errors within the set of most important bits. Then the second quality estimator may estimate another probability of errors within the whole frame.

According to the preferred embodiment of the invention, the statistic unit STAT is activated by the control unit CTRL upon reception of the first and second error probability estimations, if the first and second error probability estimations differ from each other to an extent which is larger than a predetermined threshold.

According to the preferred embodiment of the invention, the statistic unit calculates an intra-parameter difference between the current parameter value and the last uncorrupted value of the same parameter in order to compare said difference with a reference value. If the difference is larger than the reference value, the current parameter is considered to be corrupted and will not be used as such for further processing. Preferably, this corrupted parameter will be corrected, for example, by replacing it with the last uncorrupted parameter or by using any other correction method.

Figure 2:
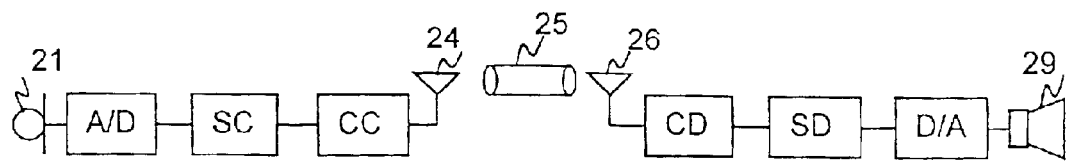
FIG. 2 is a schematic block diagram for illustrating an example of a transmission system comprising a receiver according to the invention.

FIG. 2 illustrates an example of a transmission system in which a receiver according to FIG. 1 may be implemented. It shows a radio transmission system operating according to a communication standard, such as the GSM recommendation, but the invention also applies to any other transmission system. Numerical figures relating to the GSM standard are used as mere examples for improving the comprehension of the invention. The system of FIG. 2 comprises a transmitting part including blocks 21, A/D, SC, CC and 24 and a receiving part including blocks 26, CD, SD, D/A and 29. The system comprises:

a microphone 21 for receiving a voice signal and for converting it into an analog electrical speech signal, an analog-to-digital converter A/D for converting the analog speech signal received from the microphone 21 into digital speech samples, a speech encoder SC for segmenting the input speech samples into speech frames, of, for example, 20 milliseconds and for encoding the speech frames into a set of, for example, 76 speech parameters a channel encoder CC for protecting the speech parameters from transmission errors due to the channel, a transmitting circuit 24 for sending the speech parameter through the transmission channel, a transmission channel 25, for example, a radio channel, a reception circuit 26 for receiving the speech parameters from the transmission channel 25, a channel decoder CD for removing the redundancy bits added by the channel encoder CC and for retrieving the transmitted speech parameters, a speech decoder SD for decoding the speech parameters received from the channel decoder CD and generated by the speech encoder SC and for retrieving the transmitted speech signal, a digital-to-analog converter D/A, for converting the digital speech signal received from the speech decoder SD into an analog speech signal, a speaker or ear piece 29 for supplying an audio message to a user.

Speech encoder/decoder SC and SD, respectively, are described in the GSM recommendation 06.10 (ETS 300 961): "Digital cellular telecommunications system; Full rate speech; transcoding" May 1997, as one and the other part of the GSM full-rate speech codec. The aim of the speech codec is to reduce the transmission bit rate. A channel encoder and decoder CC and CD respectively, are described in the GSM recommendation 05.03 (ETS 300 909): "Digital cellular telecommunications system (phase 2+); Channel coding; " August 1996 as one and the other part of the GSM channel codec. The aim of the channel codec is to add redundancy to the transmitted information bits which form the speech parameters in order to protect them against channel errors.

As a matter of fact, adverse channel conditions may cause the speech parameters received by the reception circuit 26 to comprise numerous data errors. The channel encoder CC has for its object to protect the transmitted data against such channel errors. However, under extreme channel conditions, data errors may still remain besides channel coding. Error concealment procedures are thus provided to cope with remaining errors due to the channel in order to better prepare the speech decoding process and improve the final speech quality.

An error concealment device as shown with reference to FIG. 1 can be implemented in any one of the channel decoding CD or speech decoding SD blocks. It can also be implemented in a separate entity placed between the channel and speech decoding blocks.

In the channel encoder CC, information bits are ordered in a predefined frame format wherein the most relevant bit is placed before the least relevant bit as specified in the GSM recommendation 05.03 (ETS 300 909). The bit relevance is based on subjective tests. There are 50 most relevant bits which are secured by a cyclic code called CRC (Cyclic Redundancy Check) using 3 parity bits. The CRC is decoded in the channel decoder CD to detect bit errors within the 50 most relevant bits of the frame. A frame is considered to be corrupted when at least one of the most relevant bits is corrupted. The channel decoder CD then issues a bad frame indicator BFI so as to indicate that the frame was detected as corrupted by the CRC. The receiver according to a preferred embodiment of the invention may use the CRC as the first quality estimator for supplying the bad frame indicator BFI. The probability that the CRC fails to detect corrupted frames under bad channel conditions is not null. Misdetection of bad frames may occur and result in regular decoding of the missed bad frames, which would cause degradations, such as loud clicks, of the signal quality.

In the channel encoder CC, the whole frame is also secured by a convolutional code which allows estimating the bit-error rate of the whole frame. The bits are encoded in accordance with a convolutional code as specified in the GSM recommendation 05.03 (ETS 300 909) forming a convolutional code word. The convolutional code word is decoded by the Viterbi algorithm in the channel decoder. To estimate the bit-error rate, decoded bits are re-encoded and compared with the received bits. The total number of differences between the received bits and the re-encoded bits serves to calculate a receive quality estimator, denoted RX_Qual. The receiver according to the preferred embodiment of the invention may use the RX_Qual receive quality estimator as the second quality estimator in order to verify the result of the first quality estimator which may be, for example, of the CRC type. The RX Qual liability tends to depend on the signal quality. The worse the signal quality, the less reliable the RX_Qual. Consequently, the CRC is generally more reliable than the RX_Qual. Therefore, the RX_Qual result is preferably used in error concealment only when the CRC indicates a good frame. The reason is that, when the CRC already indicates a bad frame, the RX_Qual reliability is suspicious.

Figure 3:
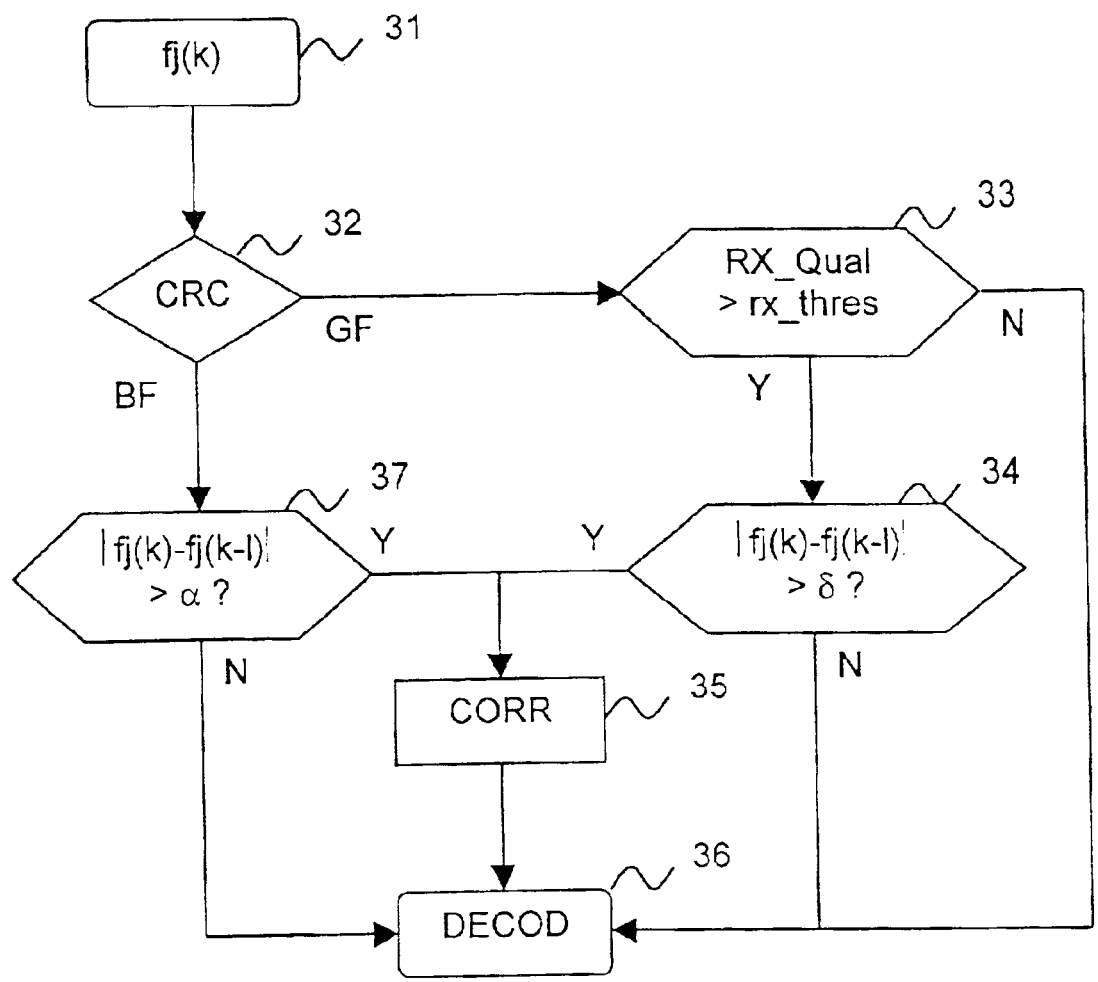
FIG. 3 is a flow chart for illustrating a method according to the invention.

FIG. 3 illustrates the main steps of an example of a method according to the invention to be carried out by a receiver as shown in FIG. 1. According to a preferred embodiment of the invention, the receiver is controlled by a computer. The computer executes a set of instructions in accordance with a program. When loaded into the receiver, the program causes the receiver to carry out the method as described hereinafter.

The method according to the invention is a method of processing an encoded signal comprising subsequent signal parameters. The signal parameters may be, for example, contained in subsequent sets of signal parameters. The method performs an error detection for detecting probably corrupted parameters. The error detection comprises the following main steps:

a reception step 31 for receiving a signal, comprising subsequent sets of n signal parameters [f1(k), f2(k), . . . , fn(k)], with n>0 and k being an integer representing the index of the current set of parameters, a first signal quality estimation step 32 for estimating a first signal quality and for deriving a first error probability estimation, a second signal quality estimation step 33 for estimating a second signal quality and for deriving a second error probability estimation and, based on the first and second error probability estimations, a comparison step 34 for comparing the signal parameters of the current set [f1(k), f2(k), . . . , fn(k)] with signal parameters of at least a previous set [f1(k−1), f2(k−1), . . . ,fn(k−1)] which were previously considered as being not corrupted, k−1 being the index of the previous set, and for deriving which parameter of the current set is probably corrupted, for the parameters which are probably corrupted, a correction step 35 (CORR) is performed, for example, for replacing the corrupted parameters with the same parameters of the previous set, if at least a parameter of the current set is not probably corrupted, the error concealment process ends and further processing 36 can be performed on this parameter, such as signal decoding (DECOD).

With respect to the GSM application, the first estimation step may consist of a Cyclic Redundancy Check (CRC) over the most relevant bits of the frame so as to determine if the frame containing the current set of signal parameters is probably corrupted. Then, according to the preferred embodiment, the second estimation step 33 is performed if the CRC result indicates a good frame (GF). The second estimation step 33 may consist of a convolutional decoding to estimate the bit-error rate within the whole frame. Such an estimate may result from the calculation of an RX_Qual type estimator. If the bit-error rate indicated by the RX_Qual type estimator is larger than a predetermined threshold, denoted rx_thres, the frame is considered as being corrupted (Y). Otherwise, it is considered as good (N). If the RX_Qual type estimator is larger than the predetermined threshold rx_thres, (Y) whereas the CRC estimator indicates a good frame (GF), the 2 estimator results are considered to be different. In this case, the comparison step 34 is carried out in order to perform a final check on each parameter of the set. In the other case, if the RX_Qual type estimator is lower or equal to the predetermined threshold rx_thres (N) whereas the CRC estimator indicates a good frame (GF), the parameters of the current set are considered as being not corrupted and can be directly decoded in step 36. The extent to which the estimators should differ in order to activate the comparison step 34 may be determined by the threshold value rx_thres set out for estimating the bit-error rate in the second estimation step 33.

When the 2 estimator results differ at least to the extent which is predetermined by the threshold value rx_thres, the comparison step 34 is performed. The comparison step 34 also allows detection of those parameters of the set that are corrupted and should be corrected before decoding. An intra-parameter difference may be calculated for each parameter of the set. The intra-parameter difference is defined as the difference between the value of a signal parameter among the current set, denoted the current signal parameter fj(k),j being the index of the parameter in the set, and a value of the same parameter in a previous set, denoted the previous parameter fj(k−1). Preferably, the previous value is the last uncorrupted value of the same parameter. As mentioned hereinbefore, the indexes k and 1 are integers, k being the index of the parameter of the current set and k−1 being, for example, the index of the last uncorrupted value of the same parameter in the previous set. The probability, denoted γ, that the absolute value of the intra-parameter difference, denoted [|fj(k)−fj(k−1)|is lower than a certain threshold, denoted δ, can be expressed by the following equation:

$$Pr[|fj(k)-fj(k-1)|<\delta]=\gamma \qquad (1)$$

where Pr[g] indicates the probability of the function g. The threshold value δ can be fixed so that the probability γ is high. Therefore, the probability that a signal parameter generates an absolute value for the intra-parameter difference lower than δ is highly probable. Such a parameter should thus be considered as being uncorrupted. On the contrary, a signal parameter generating an absolute value for the intra-parameter difference larger than δ is highly improbable. Such a parameter should thus be considered as being corrupted. Only uncorrupted parameters are to be saved for further processing (DECOD) and for calculating the intra-parameter differences. The parameters considered as being corrupted should be corrected (CORR).

When the first quality estimator 32 indicates a bad frame (BF), the same kind of intra-parameter difference as the one expressed in equation (1) may be calculated in step 37 but preferably with a different threshold value. To minimize the risk that a correct parameter is considered as being corrupted, the threshold value should be set out with respect to the corresponding probabilities as follows. The probability γ in the case a frame was first detected as good (GF) by a CRC type procedure should be larger than the probability, denoted β, in the case a frame was detected as bad (BF) by a CRC type procedure. The threshold values should consequently be set out to meet the above-mentioned probabilities: γ>β.

The received parameters which are detected as uncorrupted are stored so as to be used in the comparison steps 34 or 37. They may also be used for further processing 36 such as signal decoding (DECOD). The parameters which are detected to be corrupted by any of the steps 34 or 37 should be corrected in a correction step 35 before decoding.

Figure 4:
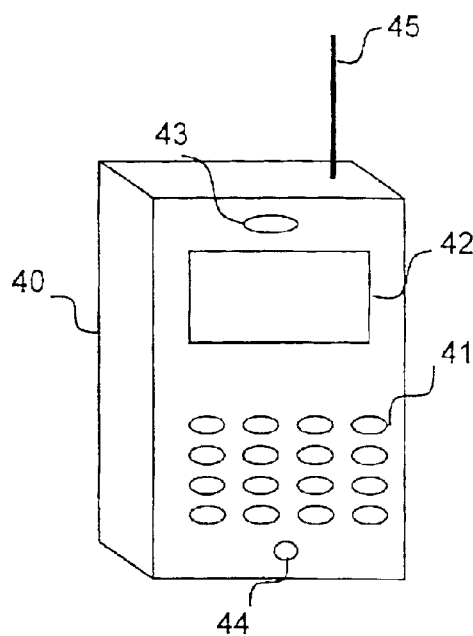
FIG. 4 shows an example of a radio telephone according to the invention.

FIG. 4 shows a radio telephone according to the invention, comprising a receiver as shown in FIGS. 1 and 2. It comprises a housing 40, a keyboard 41, a screen 42, a speaker 43, a microphone 44 and an antenna 45. The antenna is coupled to a receiving circuit and a channel decoder as shown in FIG. 2 with reference 26 and CD, respectively, the channel decoder CD comprising a receiver having an error concealment device as shown in FIG. 1.

The drawings and their description hereinbefore illustrate rather than limit the invention. It will be evident that there are numerous alternatives which fall within the scope of the appended claims. In this respect, the following closing remarks are made.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that a function is carried out by an assembly of items of hardware or software, or both.

Any reference sign in a claim should not be construed as limiting the claim. Use of the verb "to comprise" and its conjugations does not exclude the presence of elements or steps other than those stated in a claim. The article "a" or "an" preceding an element or step does not exclude the presence of a plurality of such elements or steps.

What is claimed is:

1. A method of processing an encoded signal comprising subsequent signal parameters, the method comprising an error detection step for detecting probably corrupted parameters, wherein the error detection step comprises the following sub-steps:

a first estimation of a first signal quality for deriving a first error probability estimation, a second estimation of a second signal quality for deriving a second error probability estimation;

determining if a difference between the first error probability estimation to the second error probability estimation exceed a predetermined threshold; and based on the stop of determining, performing a comparison between a current signal parameter and at least a previous signal parameter so as to derive if the current parameter is probably corrupted.

2. A method as claimed in claim 1, wherein the first and second estimation steps are based on different quality criteria.

3. A method as claimed in claim 1, wherein the comparison step calculates a difference between the current parameter and the last uncorrupted parameter in order to compare said difference with a reference value.

4. A method as claimed in claim 1, wherein the signal parameters are contained in frames, and at least the first estimation step estimates the probability of errors within a frame.

5. A method as claimed in claim 4, wherein the frame comprises a set of most important bits, and the first estimation step estimates the probability of errors within the set of most important bits.

6. A method as claimed in claim 1, wherein the determining step further comprises varying the predetermined threshold in accordance with the first error probability estimation.

7. A method as claimed in claim 1, wherein the determining step further comprises decreasing the predetermined threshold if the first error probability estimation indicates that the encoded signal is corrupt.

8. A method as claimed in claim 1, wherein the determining step further comprises increasing the predetermined threshold if the first error probability estimation indicates that the encoded signal is not corrupt.

9. A method as claimed in claim 1, wherein the step of performing based on the step of step of determining does not perform the comparison if the first error probability estimation indicates that the encoded signal is not corrupt.

10. A computer program product for a receiver comprising a set of instructions which when loaded in the receiver, causes said receiver to carry out a method as claimed in claim 1.

11. A receiver for receiving an encoded signal comprising signal parameters, the receiver comprising error detection means for detecting probably corrupted signal parameters, wherein the error detection means comprise:

a first quality estimator for supplying a first error probability estimation of a first signal quality, a second quality estimator for supplying a second error probability estimation of a second signal quality, a comparison unit for comparing a current parameter with at least a previous parameter and to derive if the current parameter is probably corrupted, a control unit for activating the comparison unit if the difference between the first and second error probability estimations exceeds a predetermined threshold.

12. A receiver as claimed in claim 11, wherein the first and second quality estimators are based on different quality criteria.

13. A receiver claimed in claim 11, wherein the comparison unit calculates a difference between the current parameter and the last uncorrupted parameter in order to compare said difference with a reference value.

14. A receiver as claimed in claim 11, wherein the signal parameters are contained in frames and at least the first quality estimator estimates the probability of errors within a frame.

15. A receiver as claimed in claim 14, wherein the frame comprises a set of most important bits, and the first quality estimator estimates the probability of errors within the set of most important bits.

16. A receiver as claimed in claim 11, wherein the control unit varies the predetermined threshold in accordance with the first quality estimator.

17. A receiver as claimed in claim 11, wherein the control unit prevents the comparison if the first quality estimator indicates that the encoded signal is not corrupt.

18. A radio telephone for receiving encoded speech signals comprising speech parameters, characterized in that it comprises a receiver as claimed in claim 11.

\* \* \* \* \*